June 3, 1969 A. H. BOBECK 3,448,441

INCREASED AMPLITUDE DOMAIN DEVICE

Filed March 8, 1966

INVENTOR
A. H. BOBECK

Herbert M. Shapiro
ATTORNEY

United States Patent Office 3,448,441

Patented June 3, 1969

3,448,441
INCREASED AMPLITUDE DOMAIN DEVICE

Andrew H. Bobeck, Chatham, N.J., assignor to Bell Telephone Laboratories, Incorporated, New York, N.Y., a corporation of New York Filed Mar. 8, 1966, Ser. No. 532,624
Int. Cl. G11b 5/62
U.S. Cl. 340—174 5 Claims

ABSTRACT OF THE DISCLOSURE

A magnetic domain propagation medium exhibits an augmented output when interrogated if the output portion of the medium is wound into a coil geometry through which a domain wall is propagated prior to the interrogation operation.

This invention relates to improvements in magnetic domain wall devices and has for its primary object to provide outputs of increased amplitude therefrom.

Magnetic domain wall devices are devices comprising an elongated magnetic material characterized by the ability to sustain a reverse (magnetized) domain therein in response to a first field in excess of a nucleation threshold and to move that reverse domain in response to a second field in excess of a propagation threshold and less than the nucleation threshold. The material is, conveniently, in the form of a wire to which the means for providing the various fields are coupled. Such a device is operated in response to an input pulse (binary one) such that the initial magnetization of the wire is reversed in a limited "domain" of the wire forming what are called domain walls with the (magnetization of the) bounding portions of the wire. The thus formed "reverse" domain or, alternatively, a single domain wall, is moved along the wire in response to appropriately applied second fields. The passage of a domain wall by a position in the wire to which an output conductor is coupled induces a pulse in the conductor. The absence of an input pulse (binary zero) at a particular clock time is indicated by the corresponding absence of a reverse domain.

It is desirable to generate a sufficiently large pulse in the output conductor to drive logic circuits in the absence of amplifying circuitry. The amplitude of the output pulse, however, is determined basically by the amount of flux in the domain wall and the time the wall takes to pass the output coupling. For realizable times for the wall to pas the coupling, the output pulses have insufficient amplitude for driving logic circuitry directly.

Copending application Ser. No. 499,849, filed Oct. 21, 1965, for D. H. Smith describes an arrangement for locally accelerating the domain wall at an output coupling for increasing the output pulse and thus simplifying the domain wall-logic circuit interface. When such an arrangement is employed, particularly with multiple turn output couplings, pulses compatible with the drive requirement of a number of available logic circuits are achieved with little or no amplification.

There are limitations to the amplitudes realizable with such an arrangement, however. For example, a domain wall may be accelerated only within certain limits as is clear from the above-mentioned application. Moreover, there are practical limitations to the number of turns by which the output conductor may profitably couple the domain wall wire. More specifically, the domain wall may be accelerated by a field of an amplitude below that which nucleates additional (spurious) reverse domains. If fields of higher amplitudes are employed, information in the domain wall wire may be lost. In addition, the number of turns by which the output conductor is coupled to the domain wall wire is, for all practical purposes, limited to the length of the wire occupied by a domain wall. Additional turns serve primarily to lengthen the duration of the output pulse.

Other attempts have been made to increase the amplitude of the output pulses of domain wall devices. One such attempt utilizes many magnetic wires in parallel and adds the amount of flux in each to induce a relatively large output pulse in a single output conductor. Such an arrangement, however, requires additional space and wire, increasing the cost of the implementation. Another such attempt is disclosed in Patent No. 3,090,946 of A. H. Bobeck issued May 21, 1963. In the last mentioned patent, the magnetization of a portion of a magnetic wire is reversed for providing relatively large output pulses. The advantages of this arrangement, however, are accompanied by the losses characteristic of open-flux structures.

The object then is to provide a flexible domain wall device which delivers, in an efficient manner, output pulses which are of amplitudes sufficient to drive even an electromagnetic relay, certainly of amplitudes permitting great flexibility with a wide variety of logic circuitry having widely varying drive requirements.

The invention is based on the realization that the flexibility of the magnetic structure itself provides a means for realizing the foregoing and further objects of this invention. Specifically, a magnetic wire is sufficiently flexible to be curled into a substantially closed (low loss) geometry such as a spiral the "multiple turns" of which then may be coupled by an output conductor itself having a single or, alternatively, a prescribed number of turns. The amplitude of an output pulse from such an arrangement depends primarily on the number of turns of magnetic wire in the spiral as does a pulse in a laminate core transformer secondary depend on the number of layers (amount) of magnetic material in a laminate core. The contouring of a magnetic wire into a spiral at an output thereof thus permits output pulses of arbitrary amplitude, and also permits a design flexibility corresponding to that of transformers.

In one embodiment of this invention, a magnetic wire domain wall device is spiraled to form a multiturn loop (core) to which an output conductor is coupled. The loop is also threaded by a bias conductor to which a DC voltage level is provided for generating a circular field in the turns of the loop. A reverse domain is provided ina portion of the wire remote from the spiral and expanded so that a domain wall thereof advances to the the influence of the circular field of the DC bias. A pulse spiral. The domain wall "winds" around the spiral under applied to a reset conductor coupled to the spiral reverses the flux in the spiral generating in the output conductor a pulse of an amplitude dependent on the flux in the material of the spiral and the time for reversing that flux.

Accordingly, a feature of this invention is a magnetic device including a magnetic wire having a spiral portion and means for generating a circular field about that spiral.

Another feature of this invention is a domain wall device including a magnetic wire, a portion of which is formed into a substantially closed geometry, means for moving a domain wall through the closed geometry thus reversing the magnetization there, means for initializing the magnetization of the material of the closed geometry and output means coupled to the portion of closed geometry.

The invention and the various objects and features thereof may be understood more fully from a consideration of the following detailed description rendered in conjunction with the accompanying drawing in which.

Figure 1:
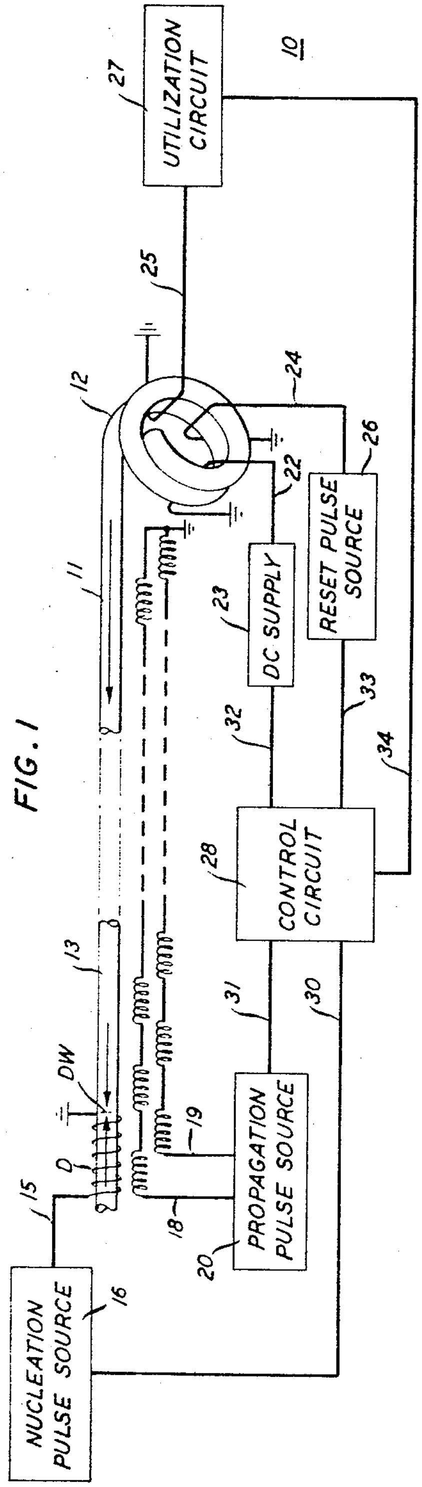
FIG. 1 is a schematic representation of a magnetic circuit in accordance with this invention.

Specifically, FIG. 1 shows a magnetic circuit 10 comprising a magnetic domain wall wire 11 including a multiturn (illustratively two turn) spiral portion 12 and a remaining portion 13. An input conductor 15 is coupled to portion 13 of wire 11 defining an input position there. Conductor 15 is connected between a nucleation pulse source 16 and ground. Propagation conductors 18 and 19 are coupled to portion 13 of wire 11 in an interleaved fashion, now well understood in the art, to provide step-along magnetic fields for the advance of a domain wall through wire 11. The couplings between propagation conductors 18 and 19 and wire 11 are indicated by coils, designated 18 and 19, beneath the representation of wire 11. Conductors 18 and 19 are connected between a propagation pulse source 20 and ground.

Portion 12 of wire 11 is coupled by a bias conductor 22 which is connected between a D-C supply 23 and ground. Similarly, portion 12 is coupled by reset and output conductors 24 and 25 connected between reset pulse source 26 and utilization circuit 27, respectively, and ground. Nucleation pulse source 16, propagation pulse source 20, D-C supply 23, reset pulse source 26, and utilization circuit 27 are connected to a control circuit 28 via conductors 30, 31, 32, 33, and 34, respectively. The various sources, supplies and other circuits described herein may be any such circuits capable of operating in accordance with this invention.

The circuit of FIG. 1 is operated such that a reverse domain D is selectively formed in response to the presence or absence of an input pulse in conductor 15. The operation wherein a pulse is present is described. For the case where a pulse is absent, only a negiligible corresponding output is observed.

Specifically, nucleation pulse source 16 applies a pulse to conductor 15, under the control of control circuit 28, for providing a reverse domain in the coupled portion of wire 11. For this description, the initial magnetization of wire 11 is assumed in a direction represented by arrows directed to the left as shown in FIG. 1. A reverse magnetized domain, repersented by an arrow directed to the right, defines a domain wall DW with the portion of wire 11 magnetized in the initial direction. The nucleation pulse P15 is shown applied at a time *t1* in the pulse diagram of FIG. 3. A D-C level, designated DC in FIG. 3, supplied via conductor 22 by means of D-C supply 23 under the control of control circuit 28 is assumed present at time *t1*. The function of the D-C level is described hereinafter.

Figure 2:
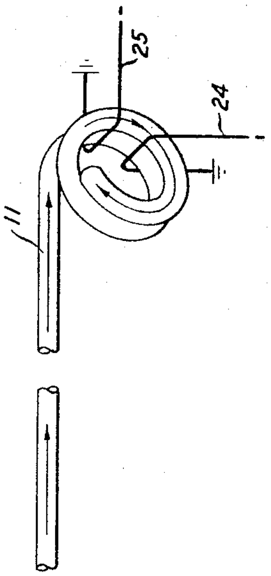
FIG. 2 is a schematic representation of a portion of the magneitc circuit of FIG. 1.

The domain wall DW is advanced through wire 11 by propagation pulses P18 and P19 applied alternately to propagation conductors 18 and 19 by propagation pulse source 20 under the control of control circuit 28. Representative pulses are shown initiated at a time designated *t2* in FIG. 3. It is noted that adjacent couplings between a propagation conductor (18 or 19) and domain wall wire 11 are of like sense and so the pulses applied provide digital means for advancing the domain wall to portion 12 of wire 11. When the domain wall arrives at portion 12 of wire 11 it is influenced by the field generated by the D-C level on conductor 22 and advances to the end of the wire 12. The magnetization of the entire wire then is in the reverse magnetization direction as indicated by the arrows directed to the right and clockwise in FIG. 2.

Figure 3:
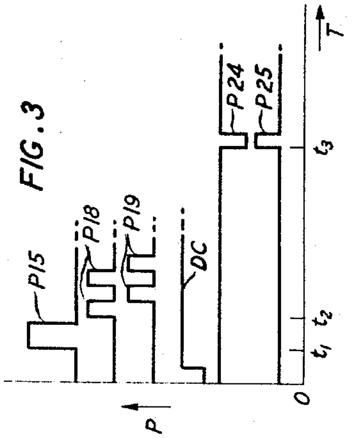
FIG. 3 is a pulse diagram of the operation of the magnetic circuit of FIG. 1.

At a later time, designated *t3* in FIG. 3, reset pulse source 26 applies a pulse to conductor 24 under the control of control circuit 28 for resetting the flux in portion 12 of wire 11 to the initial direction effectively returning domain wall DW to portion 13 of wire 11. The reset pulse is designated P24 and is accompained by an output pulse P25, on conductor 25, of a corresponding duration as shown in FIG. 3. At the termination of the reset pulse, the field generated by the D-C level on conductor 22 returns the domain wall again to the end of portion 12 of wire 11. Alternatively, the domain wall may be returned to its original (input) position by the reversal of the polarities of the pulses applied to propagation conductors 18 and 19 during the reset operation. The domain D, in this instance, may be reduced to a subcritical length and collapsed for readying wire 11 for further operation. It is noted that if no input pulse appears during a write operation, wire 11 remains in its initial flux condition and the reset pulse provides only negligible output.

The analogy between the circuit in accordance with this invention and a transformer may be appreciated by considering portion 12 of wire 11 as a (substantially closed) transformer core. In this analogy, reset conductor 24 is the primary and output conductor 25 the secondary. It is well known in transformer design that the number of turns by which the primary and secondary windings couple the magnetic core and/or the amount of material in the core are advantageously variable for permitting most efficient coupling between driving and driven devices. An arrangement in accordance with this invention provides similar efficiency by permitting variations in the number of turns in portion 12 of magnetic wire 11 as well as variations in the number of turns by which conductors 24 and 25 couple the magnetic wire as is permitted in accordance with prior art teaching.

In one specific arrangement in accordance with this invention, portion 12 includes $10_5$ turns of 0.8 mil diameter permalloy wire wound into a core having a cross section of 250 mils on a side and an inside diameter of 250 mils. Each of conductors 24 and 25 couples those magnetic turns with 100 turns. An output pulse having an amplitude of one-half volt and a duration of ten milliseconds is provided in response to a reset pulse having an amplitude of about one ampere.

In the absence of a multiturn magnetic loop in accordance with this invention, one mile of magnetic wire with $10^7$ distributed copper turns thereon is required in any attempt to achieve corresponding results. Even then, the impedance level of such an arrangement is so high that no practical output is realized. Alternatively, in accordance with the prior art, one might attempt to achieve corresponding results by wrapping copper turns about the magnetic wire in a copper "core" (solenoid) two and one-half inches on a side (cross section). Such a solenoid, however, also is characterized by a high resistance of about $80\times10^6$ ohms. Obviously, the latter two prior art arrangements are impractical.

The invention has been disclosed in terms of a single multiturn output loop (portion 12 of wire 11) at which wire 11 terminates. Wire 11 may continue beyond such a loop and even may include additional loops of which portion 12 of FIG. 1 is representative. Inputs to such an arrangement may be by a series arrangement as shown or by a parallel input arrangment. Further, a digital propagation means is described. Other propagation means are known and useful in accordance with this invention.

Accordingly, what has been described is considered to be only illustrative of the principles of this invention and it is to be understood that various and numerous other arrangements may be devised by one skilled in the art without departing from the spirit and scope thereof.

What is claimed is:

1. In combination, a magnetic wire having a first portion thereof wound into a substantially closed geometry having a plurality of loops, said wire having a first and a second direction of magnetization along the axis thereof, means for reversing the magnetization of a second portion of said wire removed from said first portion to said second direction of magnetization thus defining a domain wall there, means for propagating said domain wall to said first portion of said wire, means for providing a magnetic field in said first portion of said wire for moving said domain wall therethrough, output means coupled to said first portion of said wire encompassing said plurality of loops there, and reset means for driving the magnetization of said plurality of loops to said first direction of magnetization thereby augmenting the output thereof.

2. A combination in accordance with claim 1 wherein said first portion of said wire is wound into a spiral.

3. A combination in accordance with claim 1 wherein said output means and said reset means each include a conductor coupled to said spiral with a single turn.

4. A combination in accordance with claim 3 wherein said magnetic wire terminates at said first portion.

5. A combination in accordance with claim 4 including means for driving said second portion of said wire to said first direction of magnetization.

References Cited

UNITED STATES PATENTS

| | | | |
|---|---|---|---|
| 2,919,432 | 12/1959 | Broadbent | 340—174 |
| 3,247,476 | 4/1966 | Pintell | 336—177 |

BERNARD KONICK, *Primary Examiner.*

S. POKOTILOW, *Assistant Examiner.*

U.S Cl. X.R.

334—8; 343—6.8